(12) United States Patent
Tam

(10) Patent No.: US 12,135,944 B2
(45) Date of Patent: Nov. 5, 2024

(54) SYSTEMS AND METHODS FOR PERFORMING WORD-SENSE DISAMBIGUATION FOR CONTEXT-SENSITIVE SERVICES

(71) Applicant: NBCUniversal Media, LLC, New York, NY (US)

(72) Inventor: Gregory A Tam, Brooklyn, NY (US)

(73) Assignee: NBCUniversal Media, LLC, New York, NY (US)

( * ) Notice: Subject to any disclaimer, the term of this patent is extended or adjusted under 35 U.S.C. 154(b) by 710 days.

(21) Appl. No.: 17/349,456

(22) Filed: Jun. 16, 2021

(65) Prior Publication Data

US 2022/0405482 A1 Dec. 22, 2022

(51) Int. Cl.
*G06F 40/35* (2020.01)
*G06F 3/0482* (2013.01)

(52) U.S. Cl.
CPC ............ *G06F 40/35* (2020.01); *G06F 3/0482* (2013.01)

(58) Field of Classification Search
CPC ........ G06F 40/35; G06F 3/0482; G06F 40/30; G06N 3/04; G06N 3/088
See application file for complete search history.

(56) References Cited

U.S. PATENT DOCUMENTS 7,869,989 B1 * 1/2011 Harvey ................. G06F 40/242
704/8
10,460,229 B1 * 10/2019 Yuan ..................... G06F 40/268

2006/0136223 A1 * 6/2006 Brun ....................... G06F 40/58
704/277
2008/0065621 A1 * 3/2008 Ellis ....................... G06F 40/279
707/999.005
2010/0004925 A1 * 1/2010 Ah-Pine ................ G06F 16/355
704/9
2011/0251839 A1 * 10/2011 Achtermann ......... G06F 40/211
704/10
2013/0013400 A1 * 1/2013 Kim ....................... G06Q 10/10
705/14.49
2018/0157644 A1 * 6/2018 Mandt .................... G06N 3/045
2018/0285781 A1 * 10/2018 Mizobuchi ........... G06F 16/353
2021/0027771 A1 * 1/2021 Hall ..................... G06F 16/3344
2021/0150631 A1 * 5/2021 Resheff .................. G06Q 40/12
2022/0215047 A1 * 7/2022 Banipal ............... G06F 16/3331

* cited by examiner

*Primary Examiner* — Daniel C Washburn
*Assistant Examiner* — Athar N Pasha
(74) *Attorney, Agent, or Firm* — Fletcher Yoder, P.C.

(57) ABSTRACT

A word-sense disambiguation service may be performed to determine the semantic context of an ambiguous targeted word in an electronic data corpus. The word-sense disambiguation service may determine the semantic context of the words in the electronic data corpus by evaluating a main word and the context words surrounding the main word in a portion of text, then determine which context words are useful in defining the semantic context of the main word. The word-sense disambiguation service may then cluster the defining context words together and use the defining context words to train a word-embedding model to recognize the semantic context of an instance of the main word based on the proximity of the defining context words to the main word. A context-sensitive service may then receive input of a desired target word, then retrieve and display the various semantic contexts of the desired target word using the results gathered by the word-sense disambiguation service.

19 Claims, 12 Drawing Sheets

PLEASE INDICATE AN OBJECT YOU WOULD LIKE TO ASSOCIATE YOUR PRODUCT WITH:

| BAT\|NOUN | |
|---|---|
| X | BAT1: A MAINLY NOCTURNAL MAMMAL CAPABLE OF SUSTAINED FLIGHT, WITH MEMBRANOUS WINGS... |
|  | BAT2: AN IMPLEMENT WITH A HANDLE OR A SOLID SURFACE, USUALLY OF WOOD, USED FOR HITTING THE BALL IN GAMES SUCH AS BASEBALL, CRICKET, AND TABLE TENNIS |

FIG. 14

SYSTEMS AND METHODS FOR PERFORMING WORD-SENSE DISAMBIGUATION FOR CONTEXT-SENSITIVE SERVICES

BACKGROUND

The present invention generally relates to context-sensitive keyword disambiguation services. More particularly, the invention relates to a novel technique for determining the semantic context for one or more homographs (i.e., words with identical written forms but varying definitions) in a corpus of data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In computational linguistics, homographs, which are words that can have multiple meanings, may present many challenges, as it may be difficult to identify the sense of the word as it used in a sentence. For example, the term "bat" could refer to a flying mammal or an object used in baseball. Systems designed to perform context-sensitive services may analyze and evaluate a corpus of text to determine the semantic context of one or more keywords within the corpus of text. For the context-sensitive services to be performed effectively, the system may need to know the semantic context of the words within the corpus of text. When encountering a homograph, the system may use a variety of tools to determine the semantic context of the homograph, e.g., to determine what definition or part of speech is intended. This issue is known as "word-sense disambiguation."

One method for accomplishing word-sense disambiguation may be part of speech tagging. A model or algorithm may be programmed to determine the part of speech of a homograph based on the words surrounding the homograph. For example, the model or algorithm may analyze the sentences "Can you help me?" and "He kicked a metal can," determine that the word "can" has different parts of speech in each sentence, and tag each with its proper part of speech. After performing part of speech tagging, the model or algorithm may analyze the sentences as "Can|VERB you help me?" and "He kicked a metal can|NOUN." This may assist the model or algorithm in determining the semantic context of the homograph "can" the next time it is encountered. It should be noted that, in some embodiments, part of speech tagging may operate on every word in a sentence. For example, the sentence "He kicked a metal can" may be tagged as "He|PRON kicked|VERB a|ART metal|ADJ can|NOUN."

However, an additional level of difficulty is encountered when a homograph has multiple semantic contexts with the same part of speech. In this case, part of speech tagging is ineffective. For example, the word "bat" has multiple semantic contexts with the same part of speech; i.e., "bat" may describe multiple different common nouns. A word-sense disambiguation algorithm that encounters the word "bat" may not know whether the word refers to the animal, a bat used in baseball or some other sport, or some other meaning.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a data store, such as an electronic data corpus, may include an ambiguous word (e.g., words with multiple possible definitions). A word-sense disambiguation service may be performed on the electronic data corpus to disambiguate the ambiguous word by selecting one of the plurality of possible contexts for the ambiguous word and providing a context indication of the selected context for the ambiguous word. A context-sensitive service may receive the context indication for the ambiguous word from the word-sense disambiguation service, and perform a service that is dependent upon the context indication to provide a context-sensitive result.

In another embodiment, a word-sense disambiguation service may separate an electronic corpus of text into individual portions of text. The word-sense disambiguation service may then search the individual portions of text for occurrences of ambiguous target words by iteratively selecting a main word and creating a context window around the main word. The context window may have a main word (e.g., a target word), a number of possible context words occurring prior to the main word, and a number of possible context words occurring after the main word in the individual portions of text. The word-sense disambiguation service may then determine, for the context window created for each occurrence of the main word, which of the possible context words co-occur with the main word, and may filter, from the possible context words that co-occur with the main word, resulting in defining context words (e.g., context words that may be helpful in defining the target word). The word-sense disambiguation service may then identify one or more word clusters, where each word cluster may be associated with a particular context of the main word and each word cluster may contain the main word and the defining context words that co-occur with the main word in the context window, wherein the defining context words indicate that the ambiguous target word has the particular context associated with a corresponding cluster. In the final step of the iterative process, the word-sense disambiguation service may identify the main word as an occurrence of an ambiguous word having a plurality of possible contexts when two or more word clusters are identified as corresponding to the main word. Then, for each occurrence of the identified ambiguous target word, the word-sense disambiguation service may identify a corresponding one of the one or more word clusters, based upon the defining context words that co-occur with the occurrence and associate a disambiguation tag identifying the corresponding one of the one or more word clusters with occurrence.

In yet another embodiment, a context-sensitive service may be performed by receiving input from a user of the context-sensitive service, wherein the input is a keyword. The context-sensitive service may then determine whether the keyword is associated with a plurality of possible semantic contexts and, in response to determining that the keyword is in fact associated with a plurality of possible semantic contexts, render a graphical user interface (GUI) prompt requesting the user to select one of the plurality of possible semantic contexts. The context-sensitive service may then receive a selection indicating the semantic contexts that was selected, may search a data corpus for the keyword associated with the selected context, and finally may provide results of the search via the GUI. The search may refer to searching the data corpus for vectors similar to the vector generated and assigned to the selected semantic context.

DRAWINGS

These and other features, aspects, and advantages of the present disclosure will become better understood when the following detailed description is read with reference to the accompanying drawings in which like characters represent like parts throughout the drawings, wherein.

Figure 11:
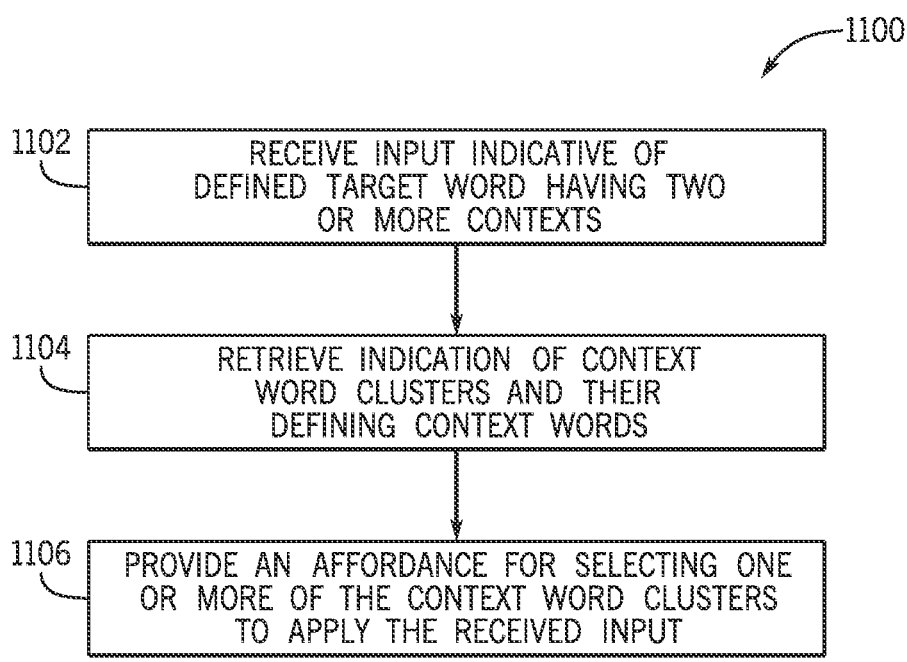
FIG. 11 is a flowchart describing the operation of the context-sensitive service enabled by the word-sense disambiguation service (e.g., as is described in FIG. 2), in accordance with one or more current embodiments.
Figure 12:
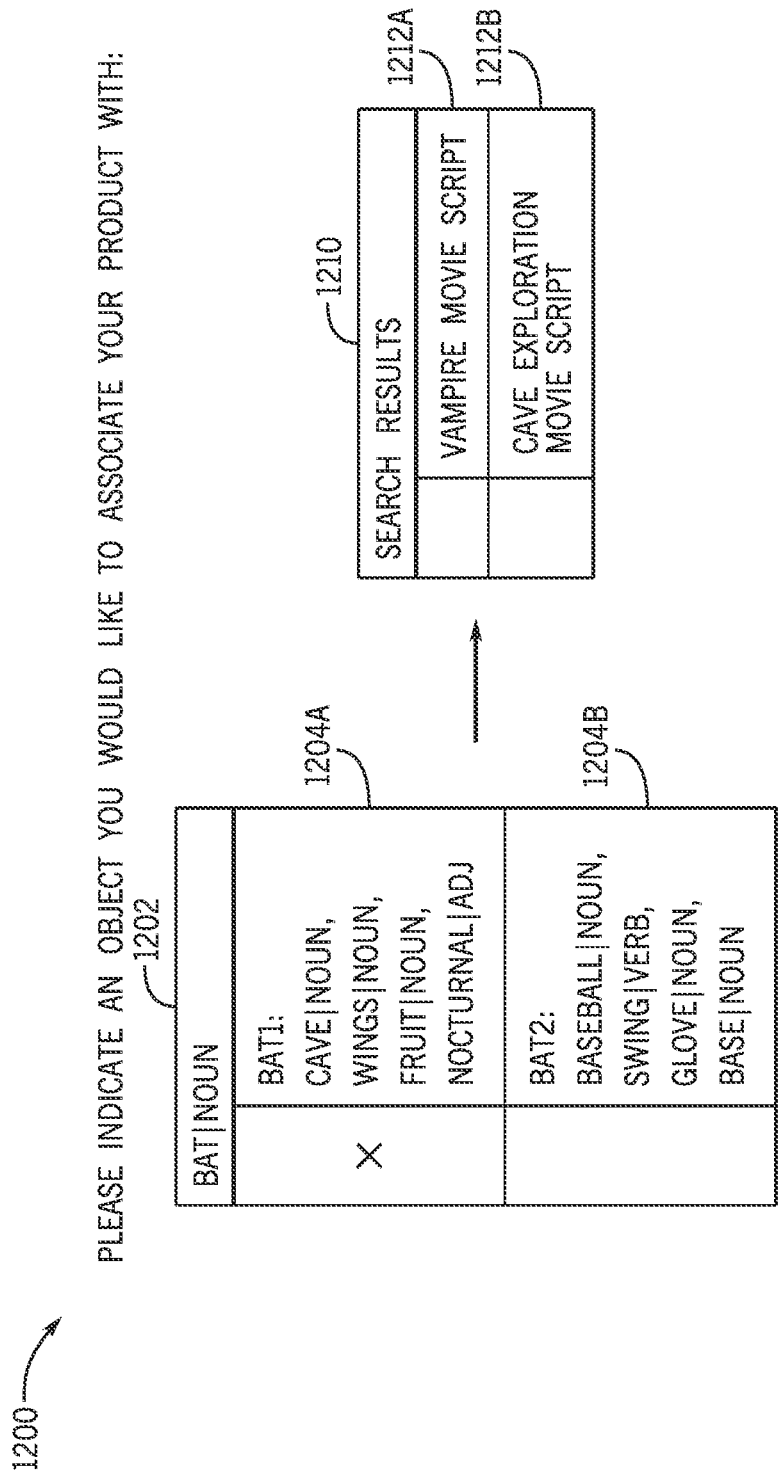
Figure 13:
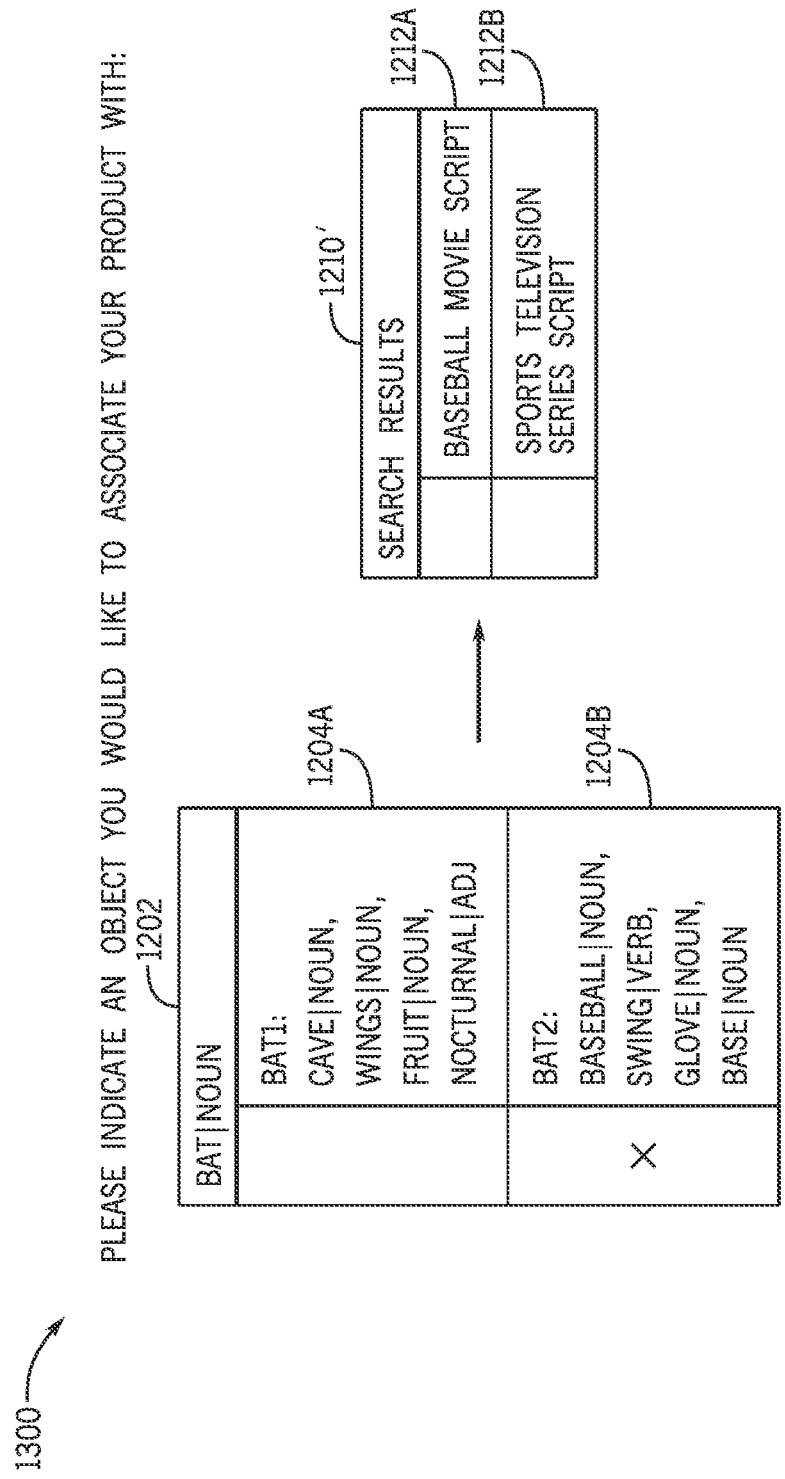

FIG. 12 is an illustration of a client-side GUI (e.g., the affordance described in FIG. 11), wherein multiple affordances, each representing a context of a target word, are provided to the client based on the identified contexts of the target word, and search results of the context-sensitive service are provided based on a selection of one or more of the affordances, in accordance with one or more current embodiments;

FIG. 13 is an alternative illustration of the client-side GUI of FIG. 12, wherein different search results are provided based on the selection of an affordance different than the affordance selected in FIG. 12, in accordance with one or more current embodiments; and FIG. 14 is an illustration of a client-side GUI (e.g., the affordance described in FIG. 11), wherein multiple definitions correlating to the multiple contexts of a target word are supplied based on the identified contexts of the target word, in accordance with one or more current embodiments.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

Context-sensitive services may be utilized in a variety of fields, such as in advertising, marketing, business, research and development, or the like. A context-sensitive service may involve parsing a corpus of text or other data to locate and identify a keyword or a set of keywords. An issue may arise when an algorithm encounters a homograph, or a word with multiple definitions and/or multiple parts of speech. If the intended semantic context of a word cannot be determined, the ability to provide context-sensitive service may be significantly impaired. The process of determining the semantic context of a word is known as word-sense disambiguation.

As previously discussed, part of speech tagging may be used to determine the context of a word by identifying the part of speech of a particular instance of the word. A word-embedding model may be programmed to determine the part of speech of a homograph based on the words surrounding the homograph. For example, the word-embedding model may analyze the sentences "Can you help me?" and "He kicked a metal can," determine that the word "can" has different parts of speech in each sentence, and tag each with its proper part of speech. The word-embedding model may use the relationship between the words of a sentence with different parts of speech to identify the context of a word. For instance, the model may use the relationship between verbs, nouns, and adjectives to determine the part of speech of a word and tag the relevant part of speech accordingly. After performing part of speech tagging, the word-embedding model may analyze the sentences as "Can|VERB you help me?" and "He kicked a metal can|NOUN."

This may assist the word-embedding model in determining the semantic context of the homograph "can" the next time it is encountered. Alternatively, each word in a sentence or sentence clause may be tagged with its part of speech. For example, the sentence "He kicked a metal can" may be tagged as "He|PRON kicked|VERB a|ART metal|ADJ can|NOUN." In some cases, tagging each word may provide more accurate results (e.g., upon a search by the context-sensitive service).

However, when a word has multiple contexts with the same part of speech, part of speech tagging is ineffective as a word-sense disambiguation tool. For example, the word "bat" may describe a flying mammal or an implement used in sports such as baseball and cricket. "Foot" may describe a unit of measurement or a body part. "Bass" may describe a type of fish or a low pitch in music. Part of speech tagging would not assist a word-sense disambiguation algorithm in determining the context of a word. One or more additional algorithmic processes may be used to determine the semantic context of a homograph that has multiple definitions with the same part of speech.

Figure 1:
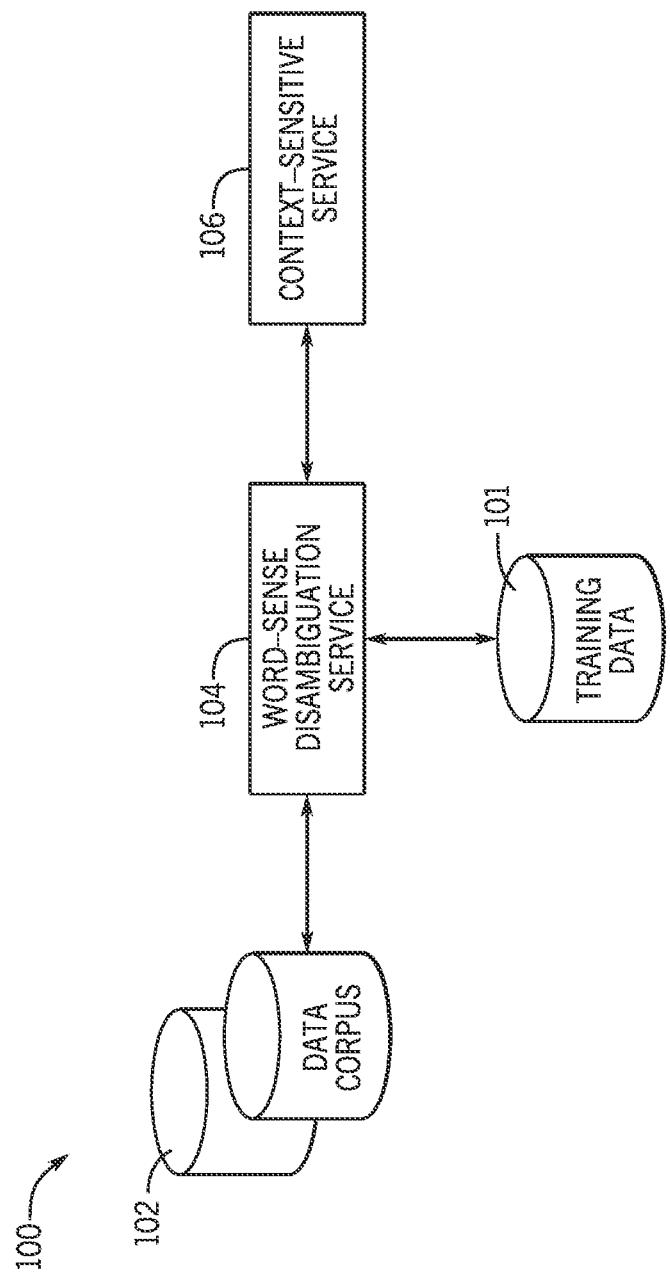
FIG. 1 is a diagram illustrating a word-sense disambiguation system, including a data corpus that serves as the foundation upon which word-sense disambiguation services are performed, and the context-sensitive services which are provided based on the word-sense disambiguation, in accordance with one or more current embodiments.

With the foregoing in mind, FIG. 1 is a diagram 100 illustrating the general relationship between training data 101, a data corpus 102, a word-sense disambiguation service 104 that provides context for target words in the data corpus, and context-sensitive services 106 that may provide services using the target word context provided by the word-sense disambiguation service 104. The data corpus 102 may be any body of text, for example a movie script, a television script, an encyclopedia or an entry of an encyclopedia, or a technical manual. The context-sensitive services 106 may provide a particular context of one or more keywords within a data corpus 102. For example, an advertiser may wish to run a certain advertisement during a commercial break of a television program with a high level of relevance to the subject matter of the advertisement. For instance, if the advertiser manufactures and sells baseball equipment, the advertiser may desire to have their advertisement run during a television program that relates to the sport of baseball, or to sports in general. This may serve to maximize the viewership of the most desired audience of the advertisement. The client may either select a broad context for which to apply the word-sense disambiguation service 104, such as "sports" or "baseball." Alternatively, the client may provide a list of keywords that may be input to the algorithm performing word-sense disambiguation services, such as "bat," "baseball," "helmet," "glove," etc.

To disambiguate words in the data corpus 102, the word-sense disambiguation service may be trained via training data 101. The training data 101 may be the data found in the data corpus 102 or may be independent data, used to identify different contexts of particular words. When training data 101 that is independent from the data corpus 102 is used, the training data 101 to process may be filtered based upon terms relevant to the data corpus 102. That is, training data 101 used by the word-sense disambiguation service 104 may be specifically tailored to the data corpus 102, by filtering out data not found in the data corpus 102. For example, the training data 101 that is available may include data related to elephants, but when the data corpus 102 does not include data related to elephants, the elephant data in the available training data 101 may be filtered out, resulting in more efficient processing of training data by the word-sense disambiguation service 104.

Once the word-sense disambiguation service 104 is performed and returns ambiguous keywords (e.g., keywords with multiple semantic contexts), the user of the context-sensitive service may select the desired context it wishes to target. Using this selected context, the context-sensitive service may analyze the data corpus 102 and identify instances of the ambiguous keywords having the selected context, and identify the segments in which those instances of the keywords occur as relevant to the user of the context-sensitive service.

As previously discussed, an issue may arise if the data corpus 102 contains homographs. For example, one of the target words chosen for the baseball equipment advertiser may be "bat." However, the word "bat" may have several definitions and/or parts of speech. To address this issue, the present methods and systems may locate and analyze a set of target words and the words surrounding the target words (e.g., "context words") to determine the context in which a particular target word is used. This process of determining the context in which a particular word is used may be referred to as word-sense disambiguation.

Figure 2:
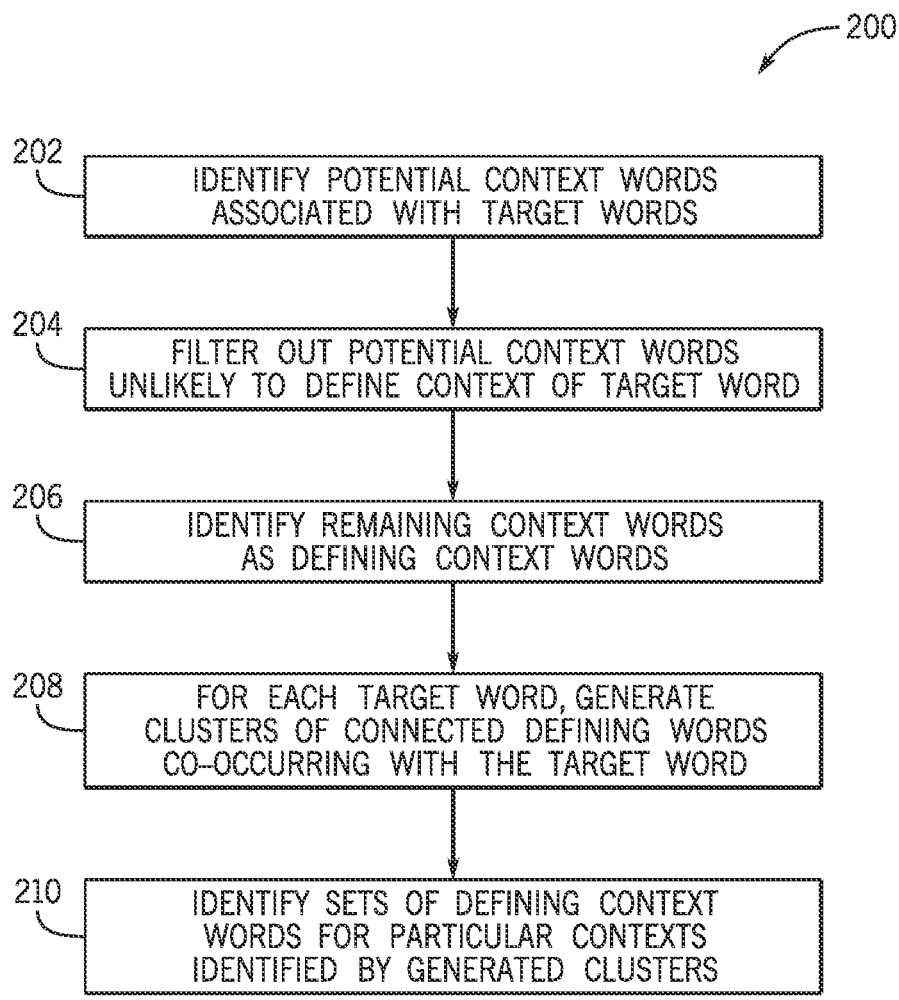
FIG. 2 is a flowchart illustrating the algorithmic process of identifying context words in a data corpus, in accordance with one or more current embodiments.

FIG. 2 is a flowchart of a process 200 for identifying context words that are useful in identifying the context of one or more target words. In process block 202, the process 200 may identify all potential context words associated with one or more specified target words. The algorithm may accomplish this by creating rolling context windows for each sentence (or, alternatively, sentence clause) in the data corpus.

The process 200 may identify the context words by creating context windows around each instance of a target word, and analyzing the other words that occur within each context window. For example, if the target word is "bat," each instance of "bat" is found in the data corpus. For each found instance of the word, the algorithm may identify a context window around the target word as a particular defined number of context words surrounding the target word. Each word that occurs within any context window may be identified by the process 200 as a potentially defining context word.

Figure 3:
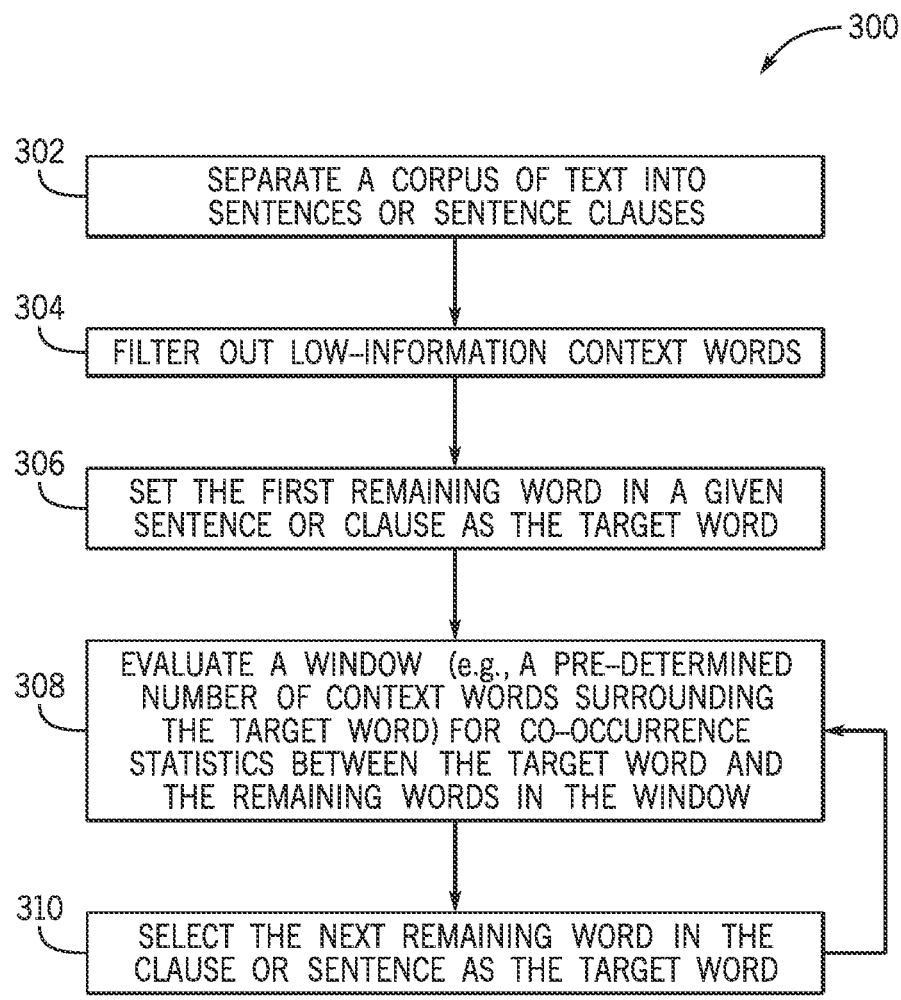
FIG. 3 is a flowchart illustrating the algorithmic process of analyzing potential context words and potential target words by implementing a rolling context window on a sentence or sentence clause within a data corpus, in accordance with one or more current embodiments.

FIG. 3 is a flowchart of a process 300 for creating and evaluating a rolling context window of process block 202. As previously stated in the discussion of FIG. 2, the rolling context window may be used by the algorithm to identify potential context words associated with potential target words in a corpus of text (e.g., the data corpus 102) prior to receiving keywords or other input from a client or user.

Figure 4:
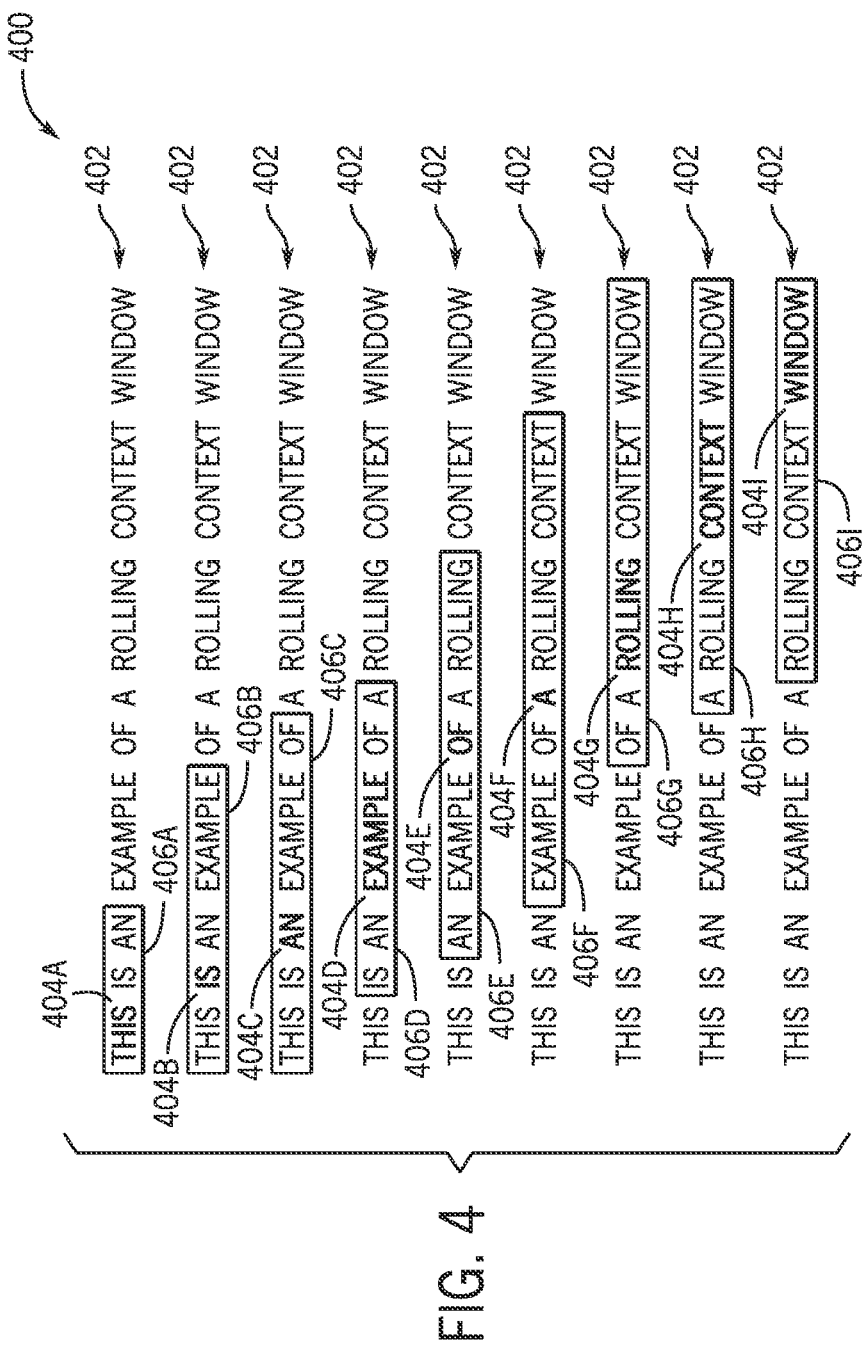
FIG. 4 is an illustration of how a rolling context window may operate on an example sentence, in accordance with one or more current embodiments.

In process block 302 the corpus of text may be separated into sentences or sentence clauses. Each sentence or clause may be analyzed by the algorithm as a separate document. FIG. 4 is an illustration 400 of the operation of a rolling context window and how the algorithm may evaluate the rolling context windows in practice. In FIG. 4, each line 402 represents a sentence that may occur within a given corpus of text.

Returning to FIG. 3, at block 304, words that do not define the target word may be filtered out. This may be accomplished in several ways, particularly by using the inverse document frequency (IDF) and context word co-occurrence methods described in the discussion of process block 202 and FIG. 4 below. The algorithm may also automatically filter out unnecessary tokens such as articles, punctuation, etc. In the example sentence provided in FIG. 4, the algorithm may filter out the words "is," "an," "of," "a," etc. and/or certain less-relevant parts of speech, such as pronouns or prepositions, retaining more-relevant parts of speech, such as nouns, verbs, and/or adjectives. Alternatively, the algorithm may evaluate the entire sentence without filtering.

In process block 306, the first word in the sentence that remains after the initial filtering process is complete is located, and may set that word as the initial target word. In process block 308, a context window may be created around the first target word (e.g., 404A or "This" in FIG. 4). The context window may be of a default size or of a size specified by a user. For example, the context window may encapsulate the target word and a number (e.g., three, five, ten, etc.) of words preceding the target word and the same number or a different number of words following the target word. In some embodiments, the context window may be defined with a variable number of words surrounding the target word, based in part upon a parts of speech of the target word and/or surrounding words. In such embodiments, the context windows are defined by sentence clauses rather than or in addition to a number of surrounding words, which, in some cases, may help provide more accurate disambiguation results.

The context window and surrounding context words may be evaluated for the purpose of calculating co-occurrence statistics for the target word and the context words. In process block 310, after evaluating a window for the first target word, processing may move to the next remaining target word, and repeat the evaluation of process block 308 on that target word.

In the illustration 400 of the rolling context window operation in FIG. 4, each context window 406A-406I corresponding to each context word 404A-404I, respectively may be evaluated. For example, in evaluating context windows 406H and 406I, the word "rolling" may be determined as co-occurring with the target word 404H (i.e., "context") and with the target word 406I (i.e., "window"). Therefore, when generating context word clusters (e.g., the clusters 610 and 650 in FIG. 6 below), the word "rolling" would appear in the cluster generated for each target word 404H and 404I. The algorithm may use a rolling context window 404 to evaluate each sentence or sentence clause in a corpus of text. By doing so, context word clusters may be generated for each word to identify potential contexts/context words.

Returning to FIG. 2, at block 204, potential context words unlikely to define the context of one or more specified target words are filtered out. One or more words within a context window may not be useful in defining the target word. For example, articles such as "the," "a," and "an" may not identify the context of a target word, and thus may be filtered out to promote efficiency. This may be accomplished by two primary operations. The first operation may be referred to as inverse document frequency (IDF), and the second may be referred to as context word co-occurrence. It should be noted that these filtering processes may occur before or after the process 300 for creating and evaluating a rolling context window.

IDF may be utilized to filter words that occur too frequently in a corpus of text (such as the data corpus 102). Words that occur with a high frequency may not be useful in defining the context of a target word. Thus, IDF may be used to filter out words that occur too frequently.

For the purposes of IDF, each sentence or sentence clause may be treated as a separate document. IDF may be calculated by dividing the total number of documents (i.e., sentences or sentence clauses) by the number of documents in which a certain context word occurs. For example, the algorithm may analyze a corpus of text containing 1,000 documents (i.e., 1,000 sentences or sentence clauses). If the word "brought" occurs in 200 documents, the IDF will be 1000/200, or 5. However, if in the same corpus of text the word "swung" occurs in only 20 documents, the IDF will be 1200/20, or 50. Therefore, a lower IDF correlates to greater frequency throughout the corpus of text. A sufficiently low IDF may indicate that the context word occurs too frequently in the corpus of text, and thus may not be useful in identifying the context of a target word. The algorithm may be programmed with a threshold IDF (e.g., 10, 20, 50 etc.), at or below which a context word may be filtered out. Further, the algorithm may calculate an average IDF and filter out words with an IDF some degree lower than the average; e.g., may filter out words with an IDF that is 50% of the average IDF or less.

Figure 5:
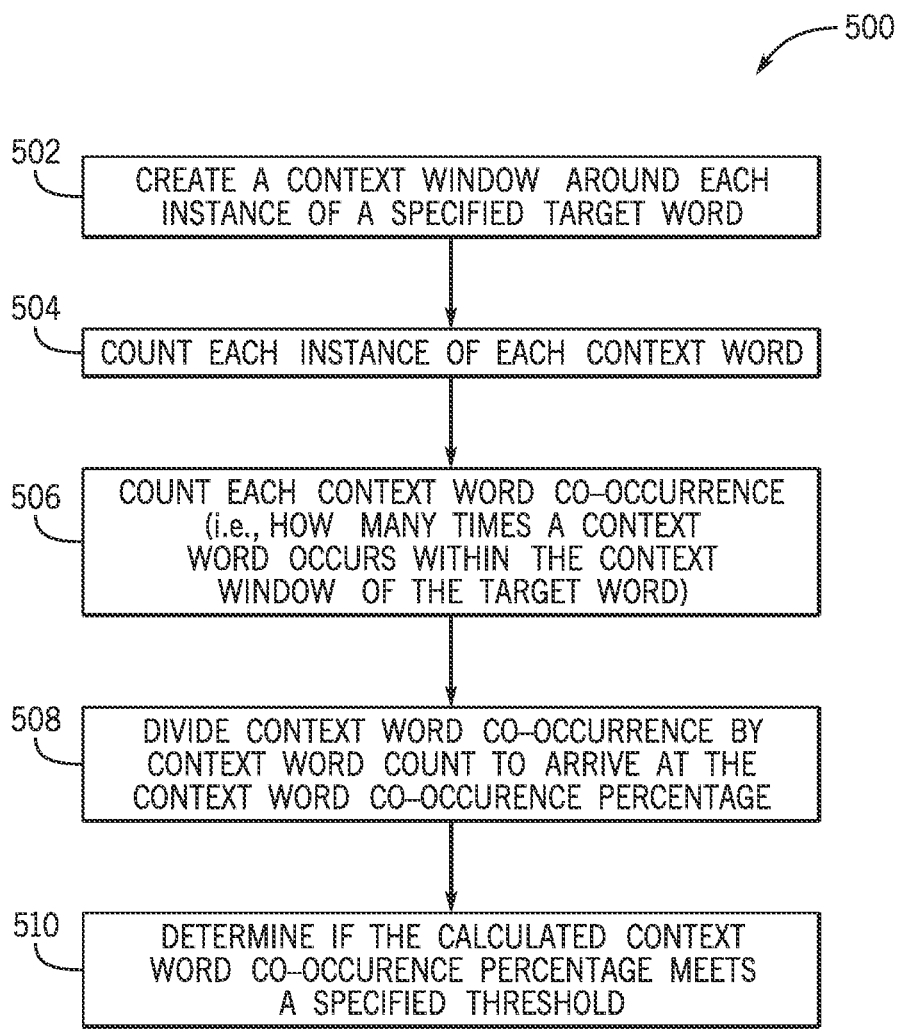
FIG. 5 is a flowchart describing a process for calculating context word co-occurrence, in accordance with one or more current embodiments.

The second filtering technique that may be used in process block 202 is context word co-occurrence. FIG. 5 is a flowchart of a process 500 that describes context word co-occurrence in detail. In process block 502, the process 500 may include creating a context window around each instance of the target word in the data corpus. In process block 504, each instance of each context word is counted. To do this, each word that occurs within the context window of the specified target word is identified and each instance of that context word throughout the data corpus is counted; whether the context word occurs in the context window or not.

In process block 506, the context word co-occurrence is counted. Context word co-occurrence is a measure of how many times a context word appears in the context window of the specified target word. For example, if the word "time" occurs within one or more context windows of the word "bat," it may be identified as a context word. However "time" may occur throughout the data corpus in instances outside of the context windows of "bat." These instances may not be counted, as they do not co-occur with the target word.

In process block 508, the context word co-occurrence percentage may be calculated. This may be calculated by dividing context word co-occurrence (i.e., the sum of the operation in process block 506) by total context word count (i.e., the sum of the operation in process block 504). In process block 510, it may be determined whether the calculated context word co-occurrence percentage satisfies a threshold percentage (e.g., 10%, 51%, or 75%). If the context word co-occurrence percentage of a certain context word fails to meet the threshold percentage, the context word may occur too frequently outside of the context window of the given target word to be useful in defining the semantic context of the target word.

Table 1 below provides examples of context word co-occurrence calculations. In Table 1, the context word "baseball" may occur 100 times total throughout a corpus of text (e.g., the data corpus 102), and may co-occur (i.e., in a context window) with the target word "bat" 80 times. Thus, the context word co-occurrence percentage is 80% (80/100). In contrast, the word "time" occurs much more frequently than the word "baseball" throughout the corpus of text, occurring a total of 20,000 times. Additionally, "time" has a higher co-occurrence count than "baseball," co-occurring with the target word "bat" 90 times. However, due to its prevalence throughout the corpus of text, the co-occurrence percentage for "time" is a mere 0.45% (90/20,000). If the algorithm in this example were set with a context word co-occurrence percentage threshold of anything above 0.45% (e.g., 1%), "time" would be filtered out.

TABLE 1

| Centre Word Count | Context Word Count | Context Word Co-occurrence Count | Context Word Co-occurrence Percentage |
|---|---|---|---|
| bat: 100 | baseball: 100 | bat & baseball: 80 | 0.8 |
| bat: 100 | time: 20000 | bat & time: 90 | 0.0045 |

Returning to FIG. 2, in process block 206, after filtering, any remaining context words (i.e., context words that were not filtered out by either IDF or context word co-occurrence) may be identified as defining words, or words to use to define the semantic context of the target word. In the examples given above for IDF, the word "swung" may be identified by the algorithm to be a defining context word, while the word "brought" may be filtered out due to an IDF that was below a designated threshold. Likewise, in the context word co-occurrence example, the word "baseball" may be identified by the algorithm to be a defining context word, while the word "time" may be filtered out due to a context word co-occurrence percentage that was below a designated threshold.

Additionally or alternatively, the algorithm may pinpoint word lemmas instead of the actual words themselves. For instance, the word "swung" would turn into "swing." This may be especially useful in the situation where the corpus of data is not large enough, since different tenses of the same word will be assigned the same token.

In process block 208 of FIG. 2, for each target word (e.g., "bat") clusters of connected defining context words (e.g., "swung" and "baseball") co-occurring with the target word may be generated. The corpus of text may contain more than one context for a target word. For example, the corpus of text may be scripts of multiple episodes or even seasons of a television program. In analyzing such a corpus of text for the target word "bat," the algorithm may encounter multiple semantic contexts of "bat." For example, the algorithm may encounter instances of "bat" that refer to the flying mammal, while other instances may refer to a baseball bat, a cricket bat, or the verb form of "bat" meaning "to hit at with the palm of one's hand." The algorithm may generate one or more context word clusters for each different context of the target word.

In certain embodiments, whether or not the target word is ambiguous (e.g., has multiple meanings) may be determined by whether or not the target word has more than one associated cluster. For instance, if word-sense disambiguation is being performed on a data corpus (e.g., the electronic scripts of several seasons of a television program), the word "saxophone" may only have one associated context word cluster, as "saxophone" may only have one common definition. However, the word "bass" may have multiple associated context word clusters. The word-sense disambiguation service may identify, and thus create context word clusters for, instances of "bass" meaning "the lowest adult male singing voice;" "a four-stringed guitar;" and "a common freshwater perch." Therefore, in some embodiments, it may be determined that a target word is ambiguous by the presence of multiple context word clusters associated with a single target word.

In process block 210, sets of defining context words for particular contexts may be identified by the generated clusters, where each cluster represents a particular context. For example, for the target word "bat," the algorithm may identify the words that separately co-occur with the varying contexts of the word "bat." One cluster may contain words relating to a baseball bat (e.g., "swung," "baseball," "glove"), while another cluster may contain words relating to the animal (e.g., "cave," "wings," "nocturnal"). In general, the algorithm may accomplish the identification by determining that the clusters do not share a sufficient number of defining context words; e.g., the context words "cave" and "wings" never co-occur with the context words "baseball" and "glove," thus the algorithm may determine that the generated clusters represent more than one semantic context of the target word "bat."

Figure 6:
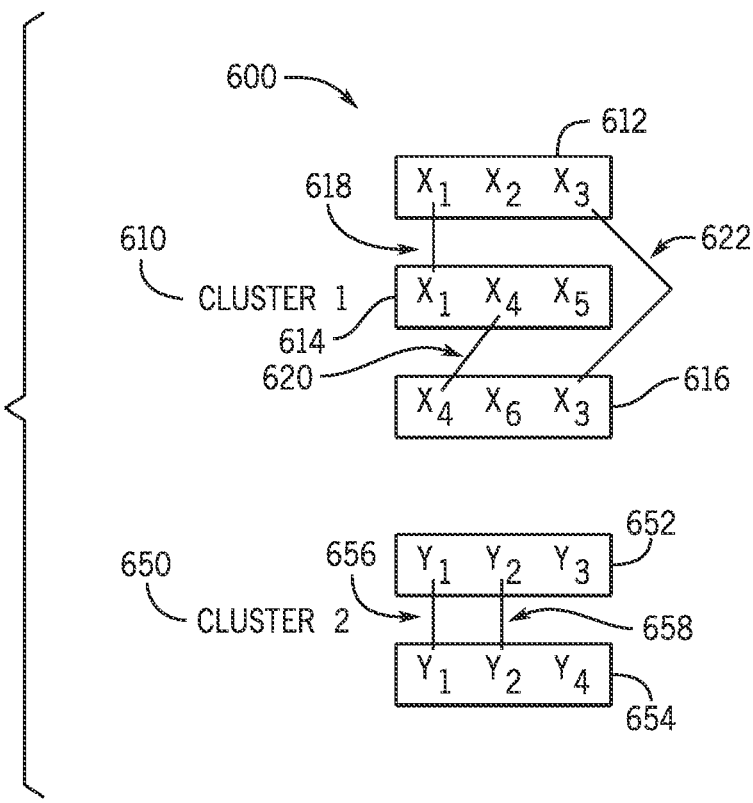
FIG. 6 is a diagram illustrating context word clustering involving two clusters representing two different semantic contexts of a target word, in accordance with one or more current embodiments.

FIG. 6 is a diagram 600 illustrating a set of context word clusters for a given target word. The algorithm may generate at least one cluster for each target word. The algorithm may further generate a different cluster for each context of the target word. For example, cluster 610 may represent the target word "bat" referring to the animal. Each set 612, 614, and 616 may represent individual context windows containing the defining context words identified by the algorithm through the filtering processes (e.g., IDF and context word co-occurrence). For example, the set 612 may represent a context window with the defining context words "nocturnal," "cave," and "wings." Set 614 may represent a context window with the defining context words "nocturnal," "fruit," and "mammal." Edges 618, 620, and 622 indicate the same context word occurring in separate context windows. For example, edge 618 may indicate that the word "nocturnal" appears in two separate context windows. Words connected by the edges 618, 620, and 622 may be more helpful in defining the context of the target word than words that do not occur in multiple context windows and/or which context words appear with one another, which may help develop the cluster 610 and separate it from other context clusters.

Cluster 650 may represent instances of the target word with a different context than the instances represented by cluster 610. For example, cluster 650 may represent the target word "bat" referring to a baseball bat. Similarly to sets associated with cluster 610, the sets 652 and 654 may represent individual context windows containing the defining context words identified by the algorithm through the filtering processes. For example, set 652 may represent a context window with the defining context words "baseball," "swung," and "slugger;" while set 654 may represent a context window with the defining context words "baseball," "swung," and "glove." Again, the edges 656 and 658 indicate the same context word occurring in multiple context windows.

The identification of sets of defining context words described in process block 210 may be accomplished in several ways. For example, the algorithm may determine that the identifying context words "nocturnal" and "mammal" never appear in cluster 650 in FIG. 6, while the identifying context words "baseball" and "swung" never appear in cluster 610. Based on the differences of defining context words, the algorithm may determine that the target words associated with these different clusters have diverging semantic contexts. Additionally and/or alternatively, there may be a library of words predetermined to indicate different contexts for ambiguous target words. Using such a library, the algorithm may determine that the words "nocturnal" and "baseball" define different contexts of the target word "bat," and assign those context words to the relevant clusters accordingly.

Figure 9:
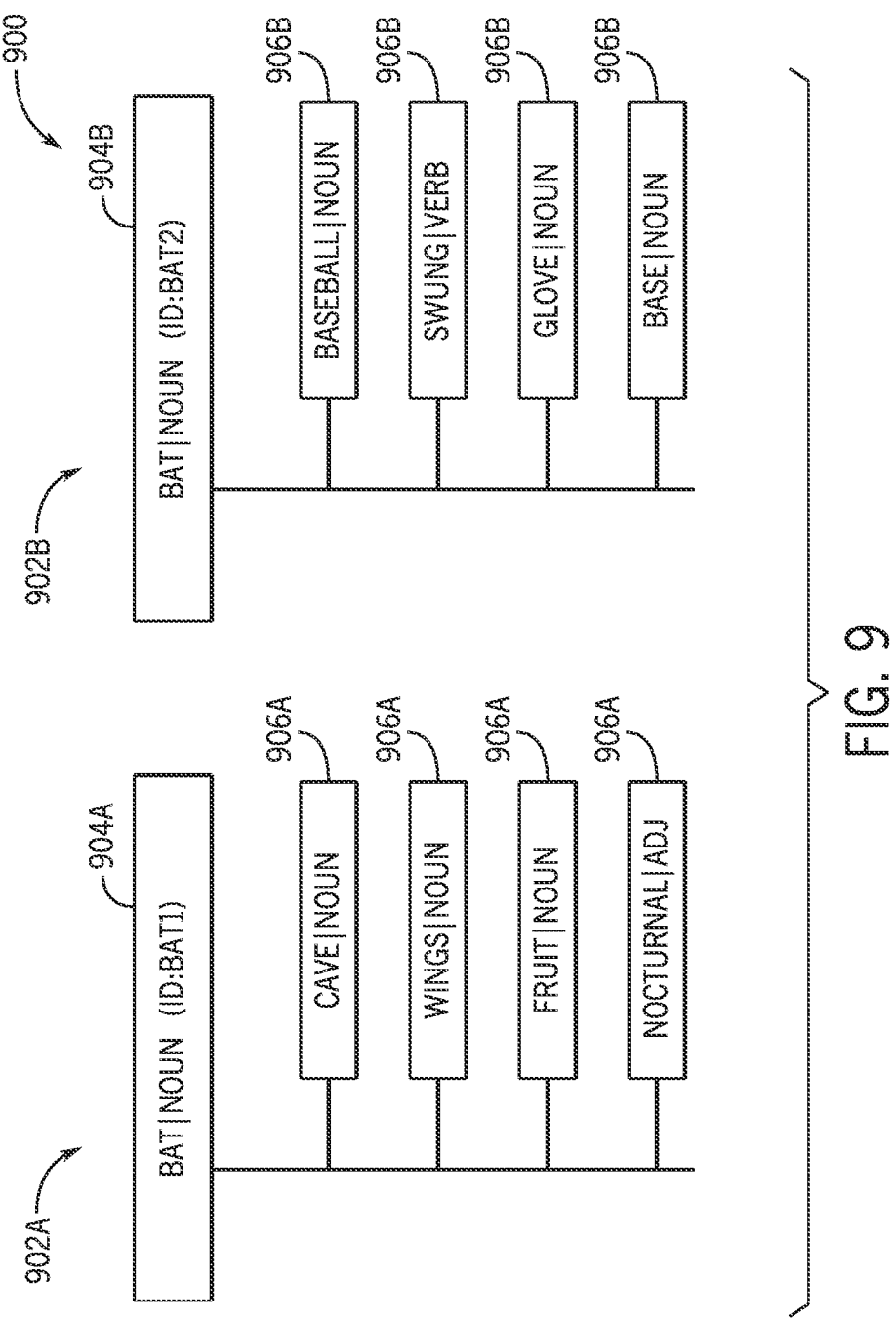
FIG. 9 is an illustration of two context word clusters, such as those described in FIG. 6, wherein the context word clusters include a target word, a disambiguation tag indicative of a semantic context of the target word, and the context words associated with each semantic context of the target word, in accordance with one or more current embodiments.

FIG. 9 provides an illustration 900 of how the context word clusters 610 and 650 in FIG. 6 may be visualized. Each cluster may be represented by a menu (e.g., a dropdown menu) 902 (illustrated as 902A and 902B), a heading 904 (illustrated as 904A and 904B) containing a disambiguation tag of the target word, and a subset 906 (illustrated as 906A and 906B) of defining context words, as may be found in the sets 612, 614, 616, 652, and 654 in FIG. 6. For example, a first cluster (e.g., cluster 610 in FIG. 6) may be represented by a menu 902A, a heading 904A that includes the target word (e.g., "Bat"), a disambiguation tag (e.g., "ID: Bat1"), and a subset 906A of identifying context words below the heading (e.g., "cave," "wings," "fruit," and "nocturnal"). A second cluster (e.g., cluster 650 in FIG. 6) may be represented by a menu 902B, a heading 904B including the target word (e.g., "Bat"), a disambiguation tag (e.g., "ID: Bat2"), and a subset 906B of identifying context words (e.g., "baseball," "swung," "glove," and "base").

Alternatively, the target word may be tagged not with a key (e.g., "Bat1" or "Bat2"), but with the context words with which the target word is associated. For example, instead of being tagged as "Bat1," an instance of "bat" referring to the animal may be tagged as "Bat|NOUN (cave|NOUN wings|NOUN nocturnal|ADJ)."

Figure 7:
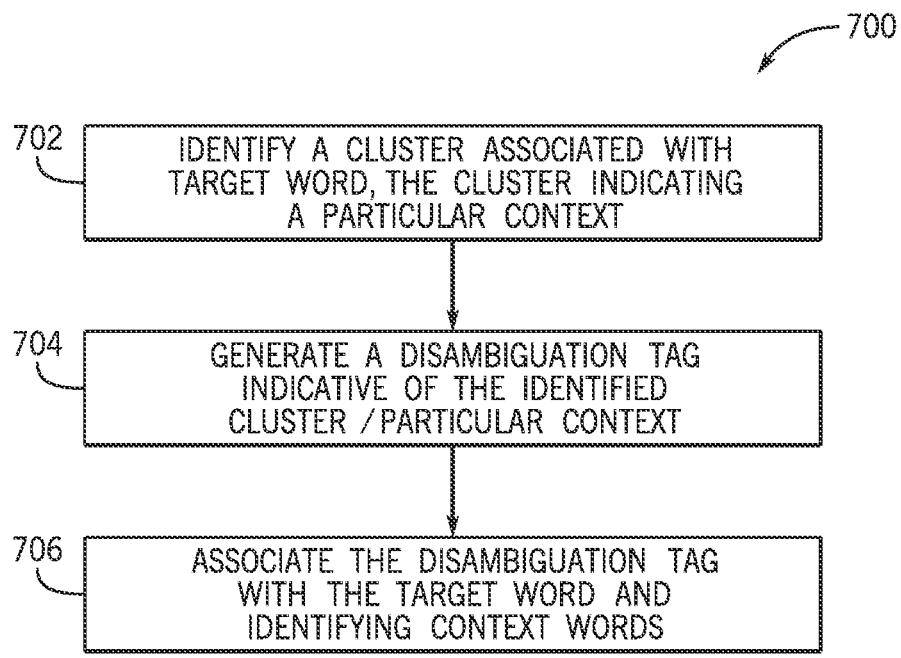
FIG. 7 is a flowchart illustrating the algorithmic process of disambiguating a particular target word and the related context words, in accordance with one or more current embodiments.

FIG. 7 is a flowchart of a process 700 for disambiguating a particular ambiguous target word. At this point in the word-sense disambiguation process, the algorithm may have identified groups of context words that are useful in defining one or more particular target words (i.e., by the process 200) and a particular target word context associated with the context words. Accordingly, now the context words can be used to identify the context of target words. In some embodiments, disambiguation tags may be associated with the target words to indicate the various contexts of the target word.

In process block 702, a particular cluster associated with a target word may be identified from a set of clusters associated with the target word, the identified cluster indicating a particular context of the target word. Returning to the example used for FIG. 6, the algorithm may identify that cluster 610 represents one context of the target word "bat" (e.g., a nocturnal, winged mammal) and cluster 650 represents a different context (e.g., an implement for hitting a ball in sports such as baseball). To identify the particular cluster, the context words associated with the target word may be identified as part of the particular cluster and, thus, the particular cluster should be used to contextualize the target word.

In process block 704, a disambiguation tag indicating the identified cluster and the associated context of the target word may be generated. For example, the algorithm may recognize, using the process 200 described in FIG. 2, that two separate context word clusters have been generated with two different identifiers. For example, "bat" may include a first cluster identified as "Bat1" and a second cluster identified as "Bat2". A tag (e.g., metadata indicative of the particular cluster) (e.g., "Bat1") may be generated to identify the particular cluster that provides context for the target word. For example, with "bat", a tag associated with the cluster 610 of FIG. 6 may be generated when the context words of cluster 610 are concurrently found with the target word. Alternatively, another tag indicative of the cluster 650 (e.g., indicative of the identifier "Bat2") may be generated when the concurrent context words are in the cluster 650. Upon appending a disambiguation tag to the target word, the target word may be represented as a vector (e.g., a real number or series of real numbers) based on the semantic context indicated by the disambiguation tag. Each of the context words associated with the target word may also be represented as a vector, where the vectors of the context words may be similar to the vector of the associated target word (e.g., the target word and the associated context word have a high cosine similarity).

In process block 706, the generated disambiguation tag may be associated with the target word. For example, if the algorithm receives the word "bat" as the target word, it may then associate the disambiguation tags indicating identifier Bat1 or Bat2 with the received target word based on the corresponding identifying context words. An illustration 1000 of this process may be seen in FIG. 10. For example, if the identifying context words "baseball" and "swung" appear in a context window of the target word "bat," the algorithm may associate that instance of "bat" with the disambiguation tag Bat2. Further, in some embodiments, the algorithm may associate the disambiguation tag Bat2 with the context words.

Figure 8:
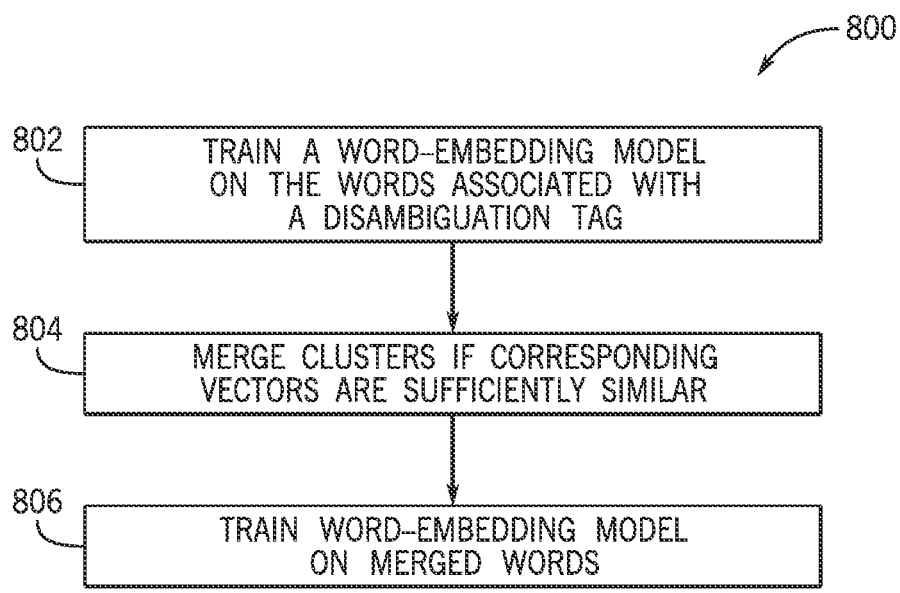
FIG. 8 is a flowchart illustrating the algorithmic process for re-analyzing a target word after disambiguation (e.g., the disambiguation tagging described in FIG. 7), in accordance with one or more current embodiments.

FIG. 8 is a flowchart of a process 800 for re-analyzing the instances of one or more target words and associated context words after establishing the context through context word clustering (e.g., after a tag is associated with a target word). In process block 802, the algorithm may train a word-embedding model (e.g., Word2Vec) on the words now associated with a disambiguation tag.

A word-embedding model may analyze a word and represent the word as a vector of a real number. The mapping of a word to a vector may be accomplished using a number of methods such as neural networks and probabilistic models, among others. In the case of homographs, the word-embedding model may represent the same word (e.g., the target word "bat") as multiple different vectors based on the context. Continuing with the above example, an instance of the target word "bat" correlating to the disambiguation tag Bat1 may be represented as one vector, while an instance of the word "bat" correlating to the disambiguation tag Bat2 may be represented as a different vector. Additionally, the contexts words correlating to their associated target word may have a vector similar to the vector of the target word. For example, "baseball" may have a vector that is similar to the instances of "bat" meaning a baseball bat. Further, the vectors for "baseball" and "bat" may be similar to the vectors for "glove," "base," and "swung." Each of these vectors may be dissimilar from the vectors for "bat" indicating the animal, as well as vectors for "cave," "wings," etc.

The training of the word-embedding model in process block 802 may consist of teaching the model which words are associated with which disambiguation tags. For example, the word-embedding model may learn (e.g., through machine learning) that the context words "baseball" and "swung" correlate to disambiguation tag Bat2. Thus, when those words appear in a context window with "bat," that instance of "bat" may be associated with Bat2.

In process block 804, the algorithm, using the trained word-embedding model, may merge separate context word clusters if corresponding vectors are sufficiently similar. However, the clusters may not always be properly separated. Indeed, multiple clusters may be generated for the same semantic context of a target word. For example, a cluster may be formed for "bat" corresponding to Bat2 (e.g., a bat used in sports such as baseball) with context words like "baseball," "base," and "swung." Another cluster may be formed containing context words such as "wooden," "implement," and "swung." Upon initially associating the target word with a disambiguation tag as described in FIG. 7, the algorithm may not have identified the context words of the second cluster as corresponding to the disambiguation tag Bat2.

Once the word-embedding model is trained, the algorithm may determine that the cosine similarity (i.e., the measure of similarity between two non-zero vectors) of the two clusters is sufficiently high. If the cosine similarity between the two context word clusters is indeed sufficiently high, the algorithm may merge the two clusters. The cosine similarity may be based on a similarity in context words; i.e., a larger number of context words shared by both clusters may correlate to a higher cosine similarity between the clusters. Continuing with the above example, the word-embedding model may merge the clusters based on the fact that "swung" appears in both clusters.

If the algorithm does not merge two or more context word clusters with the same semantic context, the clusters may be merged manually. This may occur if there are not enough examples of the given target word in the data. Gathering more data and analyzing different parts of speech of the target word may resolve this issue.

In process block 806, the word-embedding model is retrained on the merged context word clusters. Once multiple clusters with sufficiently high cosine similarity are merged, the context words may be associated with a relevant disambiguation tag so as to be identified with the semantic context of the target word. Continuing with the example set forth above, the second cluster would be assigned the same disambiguation tag Bat2 as the first cluster. Thus both the first and second clusters would be associated with Bat2. The word-embedding model would then be retrained to identify the context words "wooden," "implement," "swung," "baseball," and "base" as corresponding to Bat2.

Figure 10:
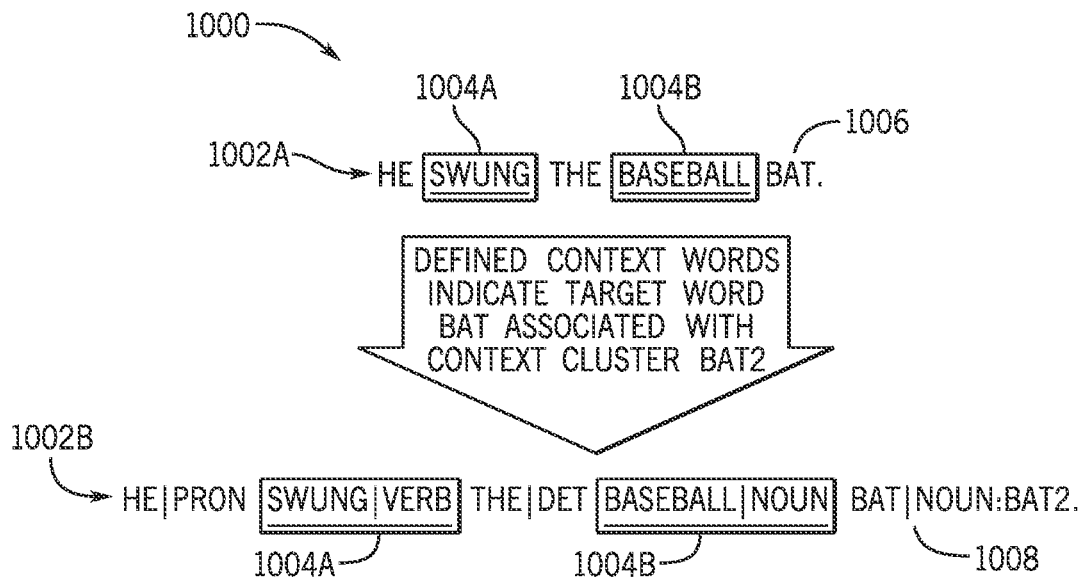
FIG. 10 illustrates the process of identifying the context of a target word and related context words and associating the target word and the related context words with a disambiguation tag (e.g., as is described in FIG. 7), in accordance with one or more current embodiments.

FIG. 10 is an illustration 1000 of the process of identifying the context of a target word using context words corresponding to a particular context of the target word and associating the target word and context words with a disambiguation tag. Sentences 1002A and 1002B (collectively sentences 1002) may be evaluated by the algorithm to determine defining context words associated with the target word 1006 (i.e., "bat"). Sentence 1002A may represent a sentence 1002 after the process 200 described in FIG. 2 has taken place. Using the process 200, the algorithm may evaluate the sentence 1002 and identify the context words 1004A and 1004B (collectively context words 1004) as defining context words for the target word 1006. 1002B may represent the sentence 1002 after the process 700 described in FIG. 7 has taken place. Using the process 700, the algorithm may identify the semantic context of the target word using context word clustering described in FIGS. 2, 6, and 7. Then, the algorithm may generate and assign a disambiguation tag 1008 determined using the context words 1004 and the context word clusters with which the context words 1004 are associated. For example, the context words 1004 in sentence 1002 in FIG. 10 are associated with the second definition of "bat" represented by the disambiguation tag 1008 (i.e., "ID:Bat2") of menu 902B in FIG. 9. Thus, the algorithm may label the target word 1006 with the associated disambiguation tag 1008 to indicate the semantic context of the target word 1006.

FIG. 11 is a flowchart of a process 1100 for performing context-sensitive services using the identified semantic context of a target word. A context-sensitive service is an electronic service where service results depend on contextual differences between identified words. For instance, a context-sensitive service may be a service related to placing advertisements in the most relevant portion of a television program, which may be determined based upon context of words associated with the portions of the television program.

In process block 1102, an input indicative of a defined target word having two or more contexts may be received. For example, an advertiser may wish to have an advertisement play during a television program involving a baseball game. As previously stated in the discussion of the word-sense disambiguation service 104 in FIGS. 2, 3, 4, and 5, the client may provide a list of keywords that the client wishes to have its advertisement associated with. For example, the advertiser may provide the keywords "baseball," "bat," "glove," "homerun," etc. The algorithm may receive as input this list of keywords and assess each as a target word in a corpus of text. When evaluating the target word "bat," the algorithm may determine that "bat" has multiple parts of speech and/or multiple semantic contexts.

In process block 1104, an identification of context word clusters and their defining context words may be retrieved for the words having multiple semantic contexts. For example, clusters 610 and 650 may be retrieved, where the cluster 610 may refer to the context of "bat" meaning the animal, as well as the defining context words corresponding to cluster 610; e.g., "nocturnal," "wings," etc. Similarly, the cluster 650 may be retrieved, where "bat" refers to a baseball bat, and defining context words such as "baseball" and "swung." In an aspect, the client may provide a grouping of keywords "baseball," "bat," "glove," "homerun," such that one keyword within the group may provide context for one or more other keywords within a group. For example, "baseball," "glove," and "homerun" may provide the context for "bat" so that the system may determine that, between the tags "Bat1" and "Bat2," "Bat2" is the more likely match given the context. This matching may be associated with a confidence level that can be a function of the number of other target words (e.g., baseball, glove, homerun) that also show up in the context cluster of a first target word (e.g., "bat").

In process block 1106, an affordance for selecting one or more of the context clusters to apply to the received input may be provided. In an example, if the confidence level is above a threshold (e.g., 90%), then the affordance may simply present the highest ranked context cluster as the recommended context cluster to the advertiser (or the user) rather than providing all of the context clusters while giving the user an option to see additional context clusters if the recommended cluster is incorrect. FIG. 12 provides a diagram 1200 illustrating what such an affordance may look like, and how the context-sensitive service 106 may operate to meet a client's needs. Graphical user interface (GUI) 1202 is an illustration of a client-side GUI, wherein multiple contexts of a target word are supplied based on the identified contexts of the target word (e.g., identified by the word-sense disambiguation service 104). The GUI 1202 may include the target word that the algorithm received as input (e.g., "Bat"). The affordances 1204A and 1204B may provide defining context words of the respective semantic contexts of the target word.

For example, if a client is a caving adventure service provider, the client may wish to have an advertisement play during a television program featuring the word "bat" in the context of the animal, and thus the client may select affordance 1204A associated with the disambiguation tag "Bat1."

Based on the selection of the affordance 1204A, the context-sensitive service 106 may perform a search on the data corpus 102, identifying portions of the data corpus 102 that may include the target word with the desired context indicated by the selection of the affordance 1204A. As previously stated, a word-embedding model may assign a vector to each instance of an ambiguous target word and associated context words to indicate the semantic context. Upon receiving a selection of the affordance 1204A (e.g., the affordance associated with the disambiguation tag "Bat1"), the context-sensitive service may search through the data corpus 102 to identify words with a vector similar to the vector representing "Bat1" (e.g., indicating greater cosine similarity). For example, if affordance 1204A is selected, the context-sensitive service 106 may identify vectors representing the context words "wings," "cave," "fruit" and "nocturnal" based on their similarity to the vector representing "Bat1." The context-sensitive service 106 may then return results based on the vectors representing the context words. For example, the context-sensitive service 106 may provide, in a search result GUI 1210, an affordance 1212A that may correspond to a script for a vampire movie, or may provide an affordance 1212B that may correspond to a script for a cave exploration movie. If the client is a caving adventure service provider, the client may be interested in advertising their products and/or services during the cave exploration movie, and thus may select search result affordance 1212B.

FIG. 13 is an alternative to the embodiment of FIG. 12. In diagram 1300, the client may select affordance 1204B in GUI 1202 corresponding to "Bat2." For example, if the client is a sporting goods store, the client may desire search results relating to "bat" meaning a baseball bat. Upon receiving the selection of the affordance 1204B, the context-sensitive service 106 may perform a search (e.g., a vector search) on the data corpus 102, identify context words with vectors similar to the vector representing "Bat2,"and return search results as shown in search result GUI 1210'. Using the context words in the affordance 1204B identified by the word-sense disambiguation service 104 (e.g., "baseball," "swing," "glove," "base") the search result GUI 1210' may provide affordance 1212A, enabling selection of a search result corresponding to a baseball movie script, or may provide the affordance 1212B, enabling selection of a search result corresponding to a sports television series script. Furthering the above example, if the baseball movie script provided by the affordance 1212A is a documentary of the life of Babe Ruth, and if the sporting goods store client desires to advertise a line of Babe Ruth-edition baseball bats, the client may select the affordance 1212A.

FIG. 12 and FIG. 13 may each represent only one embodiment of the GUI 1202 and the search result GUI 1210. The GUI 1202 and the search result GUI 1210 may feature any number of affordances based on the contexts determined within a given corpus of text. The GUI 1202 and the search result GUI 1210 may include only one affordance, or they may include a greater number (e.g., one, five, ten, etc.) of affordances if a greater number of semantic contexts associated with the target word are identified in the data corpus 102. Further, the GUI 1202 and the search result GUI 1210 may have the same number of affordances, or a different number of affordances, depending on the results of the word-sense disambiguation service 104 and the context-sensitive service 106.

FIG. 14 illustrates an embodiment of a GUI 1400 that may display a definition associated with a certain context of a target word. The GUI 1400 may include a heading 1402 with the desired target word (e.g. inputted by the client) and affordances 1404A and 1404B that may indicate the various semantic contexts of the target word, which may be determined by the context word clusters discussed in FIGS. 2, 6, and 7. However, the affordances 1404A and 1404B may provide the various contexts of the target word with a definition associated with each semantic context of the target word, rather than the defining context words identified by the algorithm (as was illustrated in GUI 1202 in FIGS. 12 and 13). The definition associated with a certain semantic context of the target word may be determined based on the similarity of the context words and the words featured in the definition. For example, if the algorithm identified the context words "nocturnal," "mammal," and "wings" within the context word cluster of an instance of "bat," it may associate the definition of "bat" with the definition seen in 1404A. The client may select either affordance 1404A or 1404B depending on the context they desire in their context-sensitive services 106.

Similarly to FIG. 12 and FIG. 13, FIG. 14 may represent only one embodiment of the GUI 1400. The number of affordances and corresponding definitions may be of any number (e.g., 1, 5, 10, and so on) depending on the number of semantic contexts identified by the word-sense disambiguation service 104 when evaluating the data corpus 102.

By employing the techniques described in the present disclosure, the systems and the methods described herein may allow for the efficient and accurate performance of the word-sense disambiguation service 104 and context-sensitive services 106. The word-sense disambiguation algorithm may break the data corpus 102 down into sentences and evaluate each sentence as its own document. The algorithm may then filter the words in each sentence based on part of speech to remove unnecessary tokens (e.g., articles, punctuation, etc.). The algorithm may then create rolling context windows 406 for each sentence and compute context word co-occurrence for each target word. The algorithm may then use co-occurrence statistics to filter out context words that are not useful in defining the context of the target word. The algorithm may then generate context word clusters (e.g., 610 and 650) using the defining context words that remain after the filtering processes, associating each instance of the context word and the target word with a disambiguation tag corresponding to the associated context word cluster. The algorithm may then train a word-embedding model on the defining context words based on their associated disambiguation tags. The algorithm may then merge two or more context word clusters if their cosine similarity is sufficiently high, and train the word-embedding model on the merged context word clusters. The context-sensitive service 106 may then generate affordances (e.g., 1204, 1404) in a GUI (e.g., 1202, 1400) based on the context word clusters 610 and 650. The context-sensitive service 106 may, upon receiving selection of the affordance 1204 or 1404, return portions of the data corpus 102 as search results based on the selection.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

What is claimed is:
1. A system comprising:
 a data store comprising an electronic data corpus, the electronic data corpus comprising an ambiguous word having a plurality of possible contexts;

a word-sense disambiguation service, configured to:
disambiguate the ambiguous word, by:
identifying a plurality of word clusters, each word cluster of the plurality of word clusters associated with a respective context of the plurality of possible contexts associated with the ambiguous word;
selecting one of the plurality of possible contexts for the ambiguous word;
associating a disambiguation tag with the selected one of the plurality of possible contexts;
training a word-embedding model on the disambiguation tag;
based upon the training, determine that two or more word clusters of the plurality of word clusters share a sufficiently similar context of the ambiguous word, as identified based upon a similarity threshold;
merging the two or more word clusters into a single merged word cluster; and
training the word-embedding model on the merged word cluster;
provide a context indication of the selected one of the plurality of possible contexts for the ambiguous word to a context-sensitive service; and
the context-sensitive service, configured to:
receive the context indication for the ambiguous word; and
perform a service that is dependent upon the context indication to provide a context-sensitive result.

2. The system of claim 1, wherein the electronic data corpus comprises a television program or movie script, an electronic technical manual, or any combination thereof.

3. The system of claim 1, wherein the context-sensitive service is performed based on keywords input by a user of the context-sensitive service.

4. The system of claim 1, wherein the word-sense disambiguation service disambiguates the ambiguous word by analyzing context words that occur near the ambiguous word in the electronic data corpus, and cross-referencing the context words with a second electronic data corpus comprising context words that may indicate a certain semantic context of the ambiguous word.

5. The system of claim 1, wherein the context-sensitive service is configured to render a graphical user interface comprising:
an indication of the plurality of possible contexts for the ambiguous word; and
for each one of the plurality of possible contexts, one or more corresponding context words determined by the word-sense disambiguation service to provide semantic context to a corresponding one of the plurality of possible contexts of the ambiguous word.

6. The system of claim 1, wherein the context-sensitive service is configured to render a graphical user interface comprising:
an indication of the plurality of possible contexts for the ambiguous word; and
for each one of the plurality of possible contexts, a corresponding definition determined by the word-sense disambiguation service to be associated with a corresponding one of the plurality of possible contexts of the ambiguous word.

7. A tangible, non-transitory, computer-readable medium, comprising computer-readable instructions that, upon execution by one or more processors, cause the one or more processors to:

separate an electronic corpus of text into individual portions of text; and
search the individual portions of text for occurrences of ambiguous target words, by iteratively:
selecting a main word;
creating a context window around the main word, the context window comprising main word, a number of possible context words occurring prior to the main word, and a number of possible context words occurring after the main word in the individual portions of text;
determining, for the context window created for each occurrence of the main word, which of the possible context words co-occur with the main word;
identifying a subset of the possible context words that are unlikely to disambiguate the main word, by:
identifying a context word count by counting each instance of a particular possible context word;
identify a context word co-occurrence count;
identifying a context word co-occurrence percentage;
determining if the context word co-occurrence percentage meets a predefined threshold; and
identifying that the particular possible context word is unlikely to disambiguate the main word when the context word co-occurrence percentage does not meet the predefined threshold;
filtering out the possible context words that are unlikely to disambiguate the main word;
identifying one or more word clusters, each word cluster associated with a particular context of the main word, wherein the main word is an ambiguous target word;
identifying the main word as an occurrence of an ambiguous word having a plurality of possible contexts when two or more word clusters are identified as corresponding to the main word; and
associating one of the one or more word clusters with the ambiguous target word.

8. The tangible, non-transitory, computer-readable medium of claim 7, wherein each word cluster comprises:
the main word; and
defining context words that co-occur with the main word in the context window, wherein the defining context words indicate that the ambiguous target word has the particular context associated with a corresponding cluster.

9. The tangible, non-transitory, computer-readable medium of claim 8, comprising computer-readable instructions that, when executed by the one or more processors, cause the one or more processors to:
identify, for each occurrence of the identified ambiguous target words, a corresponding one of the one or more word clusters, based upon the defining context words that co-occur with the occurrence of the identified ambiguous target words and associate a disambiguation tag identifying the corresponding one of the one or more word clusters with the occurrence of the identified ambiguous target words.

10. The tangible, non-transitory, computer-readable medium of claim 7, wherein the number of context words occurring prior to the ambiguous target word is either equal to or unequal to the number of context words occurring after the ambiguous target word.

11. The tangible, non-transitory, computer-readable medium of claim 7, comprising computer-readable instructions that, when executed by the one or more processors, cause the one or more processors to search the individual portions of text for occurrences of ambiguous target words until each word in the electronic corpus is selected as the main word.

12. The tangible, non-transitory, computer-readable medium of claim 7, comprising computer-readable instructions that, when executed by the one or more processors, cause the one or more processors to:
identify the possible context words that are unlikely to disambiguate the main word, by:
determining a first total, by counting a total of the individual portions of text that occurs in the electronic corpus of text;
determining a second total, by counting the number of the individual portions of text in which a particular possible context word occurs;
determining an inverse document frequency, by dividing the first total by the second total;
determining if the inverse document frequency meets a threshold inverse document frequency; and
identifying that the particular possible context word is unlikely to disambiguate the main word when the inverse document frequency does not meet the threshold inverse document frequency.

13. The tangible, non-transitory, computer-readable medium of claim 12, comprising computer-readable instructions that, when executed by the one or more processors, cause the one or more processors to:
identify the possible context words that are unlikely to disambiguate the main word, by:
identifying a context word count, by counting each instance of the particular possible context word;
identifying a context word co-occurrence count, by counting each time the particular possible context word co-occurs with the ambiguous target word in each context window;
identifying a context word co-occurrence percentage, by dividing the context word co-occurrence count by the context word count;
determining if the context word co-occurrence percentage meets a predefined threshold; and
identifying that the particular possible context word is unlikely to disambiguate the main word when the context word co-occurrence percentage does not meet the predefined threshold and the inverse document frequency does not meet a threshold inverse document frequency.

14. The tangible, non-transitory, computer-readable medium of claim 9, comprising computer-readable instructions that, when executed by the one or more processors, cause the one or more processors to:
after associating the disambiguation tags with the occurrences of the ambiguous target words:
train a word-embedding model on the associated disambiguation tags;
based upon the training, determine that two or more word clusters share a sufficiently similar context of a corresponding ambiguous target word, as identified based upon a similarity threshold;
merging the two or more word clusters into a single merged word cluster containing the defining context words of the two or more word clusters; and
training the word-embedding model on the merged word cluster.

15. A tangible, non-transitory, computer-readable medium, comprising computer-readable instructions that, upon execution by one or more processors, cause the one or more processors to:
perform a context-sensitive service, by:
receiving, via the processor, an input comprising a keyword;
determining whether the keyword is associated with a plurality of possible semantic contexts based on a plurality of context words;
identifying possible context words that are unlikely to disambiguate the keyword by:
determining a first total by counting a total of individual portions of text that occur in an electronic corpus of text;
determining a second total by counting a number of individual portions of text in which a particular possible context word occurs;
determining an inverse document frequency by dividing the first total by the second total;
determining if the inverse document frequency meets a threshold inverse document frequency;
identifying that the particular possible context word is unlikely to disambiguate the main word when the inverse document frequency does not meet the threshold inverse document frequency; and
filtering out the particular possible context word;
in response to determining that the keyword is associated with a plurality of possible semantic contexts, render a graphical user interface (GUI) prompt requesting selection of one of the plurality of possible semantic contexts;
receive a selection indicating the one of the plurality of possible semantic contexts;
search a data corpus for the keyword associated with the one of the plurality of possible semantic contexts; and
provide results of the search via the GUI.

16. The tangible, non-transitory, computer-readable medium of claim 15, comprising computer-readable instructions that, when executed by the one or more processors, cause the one or more processors to:
determine whether the keyword is associated with a plurality of possible semantic contexts by determining that the keyword is associated with a plurality of possible semantic contexts when the keyword is associated with more than one context word cluster of a word-sense disambiguation service, wherein each of the more than one context word clusters has an associated set of defining context words that define a semantic context of the keyword.

17. The tangible, non-transitory, computer-readable medium of claim 15, comprising computer-readable instructions that, when executed by the one or more processors, cause the one or more processors to:
search the data corpus for the keyword associated with the one of the plurality of possible semantic contexts, by:
searching the data corpus for occurrences of the keyword with an appended disambiguation tag indicative of the one of the plurality of possible semantic contexts;
wherein the data corpus comprises a television program script, a motion picture script, or a combination of both, and the context-sensitive service comprises a service that locates a television program, a motion picture, or both that is associated with a particular context of the keyword.

18. The tangible, non-transitory, computer-readable medium of claim 15, comprising computer-readable instructions that, when executed by the one or more processors, cause the one or more processors to:
- receive, from a word-sense disambiguation service, the plurality of possible semantic contexts associated with the keyword along with defining context words associated with each of the plurality of possible semantic contexts;
- wherein the GUI prompt comprises an affordance to select the one of the plurality of possible semantic contexts based upon the defining context words associated with each of the plurality of possible semantic contexts.

19. The tangible, non-transitory, computer-readable medium of claim 15, comprising computer-readable instructions that, when executed by the one or more processors, cause the one or more processors to:
- receive, from a word-sense disambiguation service, the plurality of possible semantic contexts associated with the keyword along with defining context words associated with each of the plurality of possible semantic contexts; and
- search an electronic dictionary to identify definitions corresponding to each of the plurality of possible semantic contexts, based upon the definitions including the defining context words;
- wherein the GUI prompt comprises an affordance to select the one of the plurality of possible semantic contexts based upon the identified definitions associated with each of the plurality of possible semantic contexts.

* * * * *